United States Patent
Heyse et al.

(10) Patent No.: US 9,515,358 B2
(45) Date of Patent: Dec. 6, 2016

(54) CONDENSING DEVICE AND METHOD FOR CONDENSING MOISTURE IN A VEHICLE BATTERY

(71) Applicant: Robert Bosch GmbH, Stuttgart (DE)

(72) Inventors: Joerg Heyse, Besigheim (DE); Peter Eitner, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 13/939,984

(22) Filed: Jul. 11, 2013

(65) Prior Publication Data

US 2014/0014298 A1 Jan. 16, 2014

(30) Foreign Application Priority Data

Jul. 13, 2012 (DE) .................. 10 2012 212 258

(51) Int. Cl.
*H01M 10/54* (2006.01)
*H01M 10/613* (2014.01)
(Continued)

(52) U.S. Cl.
CPC ....... *H01M 10/5004* (2013.01); *H01M 2/1077* (2013.01); *H01M 10/613* (2015.04);
(Continued)

(58) Field of Classification Search
CPC .............. H01M 10/613; H01M 10/625; H01M 10/6568; H01M 10/5004; H01M 10/663; H01M 2/1077; H01M 2220/20; F28F 17/005; F28F 13/187
(Continued)

(56) References Cited

U.S. PATENT DOCUMENTS 3,306,071 A * 2/1967 Holyfield ................ F24F 13/22
62/288
3,905,203 A * 9/1975 Jacob .................... F24F 3/1405
165/110
(Continued)

FOREIGN PATENT DOCUMENTS

CN 102414906 4/2012
DE 102007011026 9/2008
(Continued)

*Primary Examiner* — Tho V Duong
*Assistant Examiner* — Raheena Rehman
(74) *Attorney, Agent, or Firm* — Michael Best & Friedrich LLP

(57) ABSTRACT

A condensing system for a battery in a vehicle and a method for condensing moisture in a battery are provided. In one embodiment, the condensing system includes a battery housing, which surrounds a battery interior. At least one battery cell is arranged in the interior. An inlet opening is arranged in the battery housing, for a cooling fluid entering the battery interior. A first outlet opening and a second outlet opening are both arranged in the battery housing. The first outlet opening is in fluid communication with the cooling fluid emerging from the battery interior. A condensing device is arranged in the battery interior and is in fluid communication with the cooling fluid and causes moisture present in the battery interior to condense. The condensed moisture emerges into the environment through the second outlet opening.

6 Claims, 2 Drawing Sheets

Figure 1:
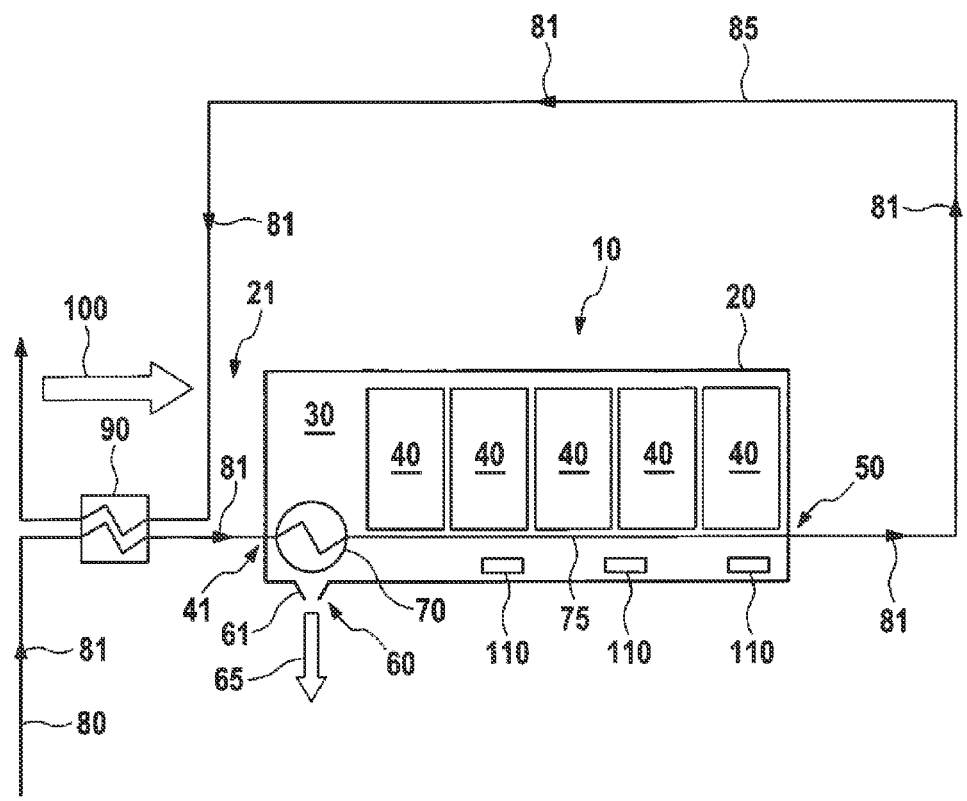

(51) Int. Cl.
*H01M 2/10* (2006.01)
*H01M 10/625* (2014.01)
*H01M 10/663* (2014.01)
*H01M 10/6568* (2014.01)

(52) U.S. Cl.
CPC ...... *H01M 10/625* (2015.04); *H01M 10/6568* (2015.04); *H01M 10/663* (2015.04); *H01M 2220/20* (2013.01)

(58) Field of Classification Search
USPC .................. 165/104.11, 41; 429/72, 120
See application file for complete search history.

(56) References Cited

U.S. PATENT DOCUMENTS

| | | | | |
|---|---|---|---|---|
| 4,518,665 | A * | 5/1985 | Fujita | H01M 2/16 429/134 |
| 2004/0194489 | A1* | 10/2004 | Pode | B60H 1/00278 62/259.2 |
| 2007/0251410 | A1* | 11/2007 | Rissanen et al. | 106/1.13 |
| 2009/0123815 | A1* | 5/2009 | Alkemade et al. | 429/50 |
| 2010/0275619 | A1* | 11/2010 | Koetting | H01M 10/613 62/79 |
| 2011/0045326 | A1* | 2/2011 | Leuthner et al. | 429/72 |
| 2011/0129723 | A1* | 6/2011 | Tsuchida | 429/163 |
| 2011/0200856 | A1* | 8/2011 | Yasui et al. | 429/88 |
| 2011/0300421 | A1* | 12/2011 | Iritani et al. | 429/72 |
| 2012/0003510 | A1* | 1/2012 | Eisenhour | H01M 10/625 429/50 |
| 2013/0111939 | A1* | 5/2013 | Yan | 62/282 |
| 2013/0209844 | A1* | 8/2013 | Gless et al. | 429/61 |
| 2013/0252043 | A1* | 9/2013 | Allison | H01M 10/1077 429/72 |
| 2013/0255293 | A1* | 10/2013 | Gadawski et al. | 62/121 |
| 2013/0255918 | A1* | 10/2013 | Wetzel et al. | 165/104.11 |
| 2013/0295423 | A1* | 11/2013 | Engel et al. | 429/83 |
| 2015/0340745 | A1* | 11/2015 | Inoue | H01M 10/6563 429/120 |

FOREIGN PATENT DOCUMENTS

| | | | |
|---|---|---|---|
| DE | 102007011026 A1 * | 9/2008 | |
| WO | WO 2012082116 A1 * | 6/2012 | H01M 2/1077 |

* cited by examiner

CONDENSING DEVICE AND METHOD FOR CONDENSING MOISTURE IN A VEHICLE BATTERY

BACKGROUND OF THE INVENTION

The present invention relates to a condensing device and to a method for condensing moisture in a vehicle battery, in particular in a vehicle battery in a motor vehicle, such as an automobile.

It is a known fact that batteries or accumulators in vehicles, especially motor vehicles, such as automobiles, are generally exposed to environmental influences, e.g. moisture, which penetrates into the interior of the battery and can cause corrosion or short circuits there, possibly leading not only to destruction of the battery but also, in some circumstances, to damage to electric loads fed by the battery (e.g. a vehicle control unit, which is relatively sensitive to voltage spikes that can arise in the event of a short circuit within the battery).

Even if the battery is protected from being sprayed directly with water, this generally being due to the arrangement of the battery in the vehicle, relatively high air humidity can cause these unwanted phenomena since complete sealing of the interior of the battery from the surrounding atmosphere is complex and expensive and, furthermore, a certain positive ventilation, at least of the area directly around the outside of the battery, to the atmosphere is in fact required, namely in the event that a safety valve of the battery opens due to excess pressure in the battery interior, allowing the excess pressure to be released to atmosphere.

The prior art, e.g. DE 10 2007 011 026 A1, includes a battery in which a cooling trap is provided for condensing and discharging moisture from the battery housing. However, this cooling trap is disclosed as a separate, additional, multi-part assembly, as a result of which additional assembly steps are required during the production of the battery, lengthening the production process and hence also making it more expensive.

SUMMARY OF THE INVENTION

Certain embodiments of the invention provide a condensing device for a battery in a vehicle, comprising: a battery housing, which surrounds a battery interior, in which at least one battery cell is arranged; at least one first inlet opening, arranged on the battery housing, for a cooling fluid entering the battery interior; at least one first outlet opening and one second outlet opening, which are both arranged on the battery housing, wherein the first outlet opening is in fluid communication with the cooling fluid emerging from the battery interior; and a condensing device, which is arranged in the battery interior and is in fluid communication with the cooling fluid and which causes moisture present in the battery interior and stemming from the environment to condense, and wherein the condensed moisture emerges into the environment through the second outlet opening.

In other embodiments, the invention provides a method for condensing moisture in a vehicle battery, namely by means of a condensing device which operates in a manner corresponding to the condensing device according to the first aspect.

One advantage of the system proposed results from the fact that a battery which is operating is cooled and moisture present in the battery interior, which enters the battery interior from the environment and is unwanted, can be condensed in a targeted manner at a specific, uncritical location in the battery interior and discharged from the battery interior, and that it is possible to avoid condensed water from being deposited on battery cells and hence to avoid corrosion on the battery cells or short circuits between them.

The condensing device preferably comprises a cooling unit, which is situated in a cooling circuit of the vehicle and is in fluid communication therewith. It is advantageous here that an already existing cooling circuit, e.g. that of an air conditioning system, can be used.

It is furthermore preferred that the cooling unit be situated outside the battery housing. It is advantageous here that, if the condensing unit is arranged within the battery interior and/or the cooling unit is arranged outside the battery interior, in each case in a region which faces a forward direction of travel of the vehicle, the cooling or condensing unit can be additionally cooled by relative wind which strikes the cooling or condensing unit during the movement of the vehicle.

The condensing device is preferably surrounded by a porous material, wherein the condensing device is in physical contact with the porous material. It is advantageous here that the moisture stored in the porous material can assist the cooling process by virtue of evaporative cooling, resulting in a reduced energy requirement for the cooling of the battery.

The porous material preferably comprises a sponge produced from a metal, although any other suitable porous material can also be considered.

It is furthermore preferred that at least one adsorbent be additionally arranged in the battery interior to assist removal of moisture in the battery interior.

BRIEF DESCRIPTIONS OF THE DRAWINGS

Figure 2:
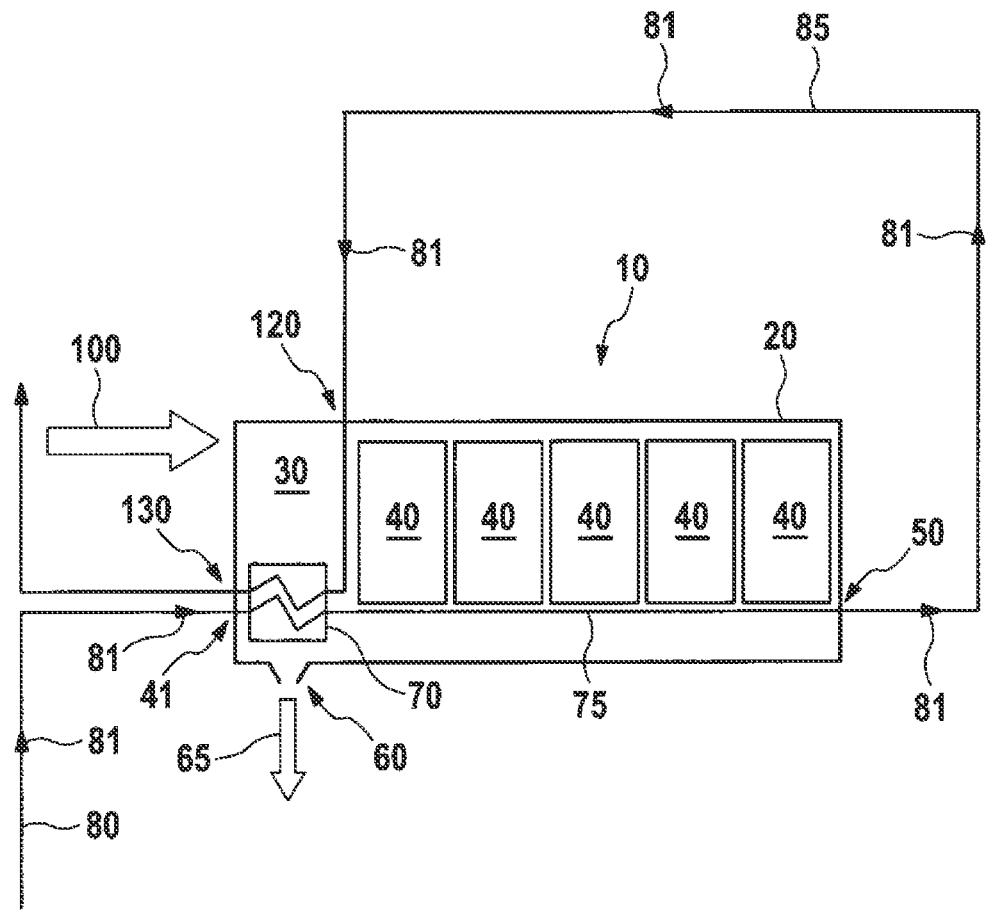

The invention is explained below by means of embodiments in conjunction with the figures, in which:

FIG. 1 shows part of a schematic structure of an illustrative vehicle cooling system having a first embodiment according to the invention; and FIG. 2 shows part of a schematic structure of an illustrative vehicle cooling system having a second embodiment according to the invention.

DETAILED DESCRIPTION

FIG. 1 shows, schematically, a battery 10 having a battery housing 20, in the battery interior 30 of which there is a plurality of accumulator cells or battery cells 40. Arranged in the battery housing 20 is an inlet opening 41 (not shown specifically), a first outlet opening 50 and a second outlet opening 60, the exact operation of which will be explained later.

Arranged in the battery interior 30 is a condensing device 70 (as it were a "condensate trap"), which is part of a cooling circuit 80 of a vehicle (not shown here), e.g. an automobile. The cooling circuit 80 is preferably a cooling circuit of an air conditioning system of the vehicle.

Cooling fluid flowing in the cooling circuit 80 in the direction of the arrows 81 flows initially into a cooling unit or heat exchanger 90 (also referred to as a "chiller") in that section of the cooling circuit 80 which is illustrated in FIG. 1, and, from there, flows through the inlet opening 41 into the condensing device 70, the operation of which is explained further below. From the condensing device 70, the cooling fluid flows in a suitable fluid line 75 through the battery interior 30, through the first outlet opening 50, back in a return line 85 into the cooling unit 90, and is then fed back to the cooling circuit 80.

In the example in FIG. 1, the condensing device 70 is designed as a flat metal component, wherein the fluid line 75 can either run through the condensing device 70 if the component has an appropriate thickness, or the fluid line 75 can be mounted on a surface of the condensing device in the manner of a cooling coil. The condensing device 70 thus has a lower temperature than the surroundings thereof in the battery interior 30, and therefore moisture present in the battery interior 30 can condense thereon, i.e. on the cooled surface of the condensing device 70.

The shaping of the condensing device 70 is such that the surface on which the moisture condenses is arranged substantially vertical, with the result that condensed moisture in the form of water droplets can drip more easily in the direction of the second outlet opening 60, more specifically through the second outlet opening 60, which is arranged in the battery housing 20, below the condensing device 70, and which is designed in the manner of a funnel-shaped depression 61 in the bottom of the battery housing 20 to allow better collection and removal of the condensed water. The emergence of the water droplets is indicated symbolically by an arrow 65. The operation of the condensing device 70 thus avoids a situation where moisture present in the battery interior 30 can settle on the accumulator cells 40 in the form of water droplets, which could lead to failure of the accumulator cells 40.

As illustrated in FIG. 1, the condensing device 70 is arranged in a region 21 of the battery interior 30 which faces a forward direction of travel of the vehicle (in FIG. 1, the forward direction of travel would be toward the left), with the result that, on the one hand, the battery 10 itself is cooled, principally in region 21, and, on the other hand, the cooling unit 90 or condensing device 70 is additionally cooled by the relative wind, indicated by an arrow 100. As a result, the air that penetrates due to the relative wind initially reaches the coldest point, namely region 21 or the condensing device 70, and can condense thereon.

In another embodiment, the condensing device 70 can comprise a porous material, e.g. a "sponge" produced from metal, through which the cooling line 75 with the cooling fluid flowing therein passes. On the one hand, the metal sponge can store the condensate and, on the other hand, can discharge it from the battery interior 30 via the second outlet opening 60. As long as the condensed water is stored in the metal sponge, e.g. in the case of a less humid and hot environment, when there is no possibility of water droplets forming owing to a relatively low air humidity, the condensed water cools the cooling fluid flowing through the metal sponge in the cooling line 75 by virtue of evaporation and thus assists the operation or action of the air conditioning system in the vehicle, i.e. the energy requirement of the air conditioning system for cooling the battery is reduced.

Of course, the porous material can also comprise any other suitable material and can also be appropriately adapted in terms of shape.

Moreover, FIG. 1 illustrates adsorbents 110 arranged in the battery interior 30, i.e. moisture-absorbing agents, e.g. silica gel, which can bind any additional moisture present in the battery interior 30. In this case, the number, shape and arrangement of the adsorbents 110 can vary according to the application.

FIG. 2 shows, schematically, another example of an embodiment according to the invention.

Once again, a battery 10 having a battery housing 20 and having accumulator cells 40 arranged in the battery interior 30 is illustrated, the number, shape, embodiment and arrangement of said accumulator cells being variable. A first inlet opening 41, a first outlet opening 50 and a second outlet opening 60 are likewise arranged in the battery housing 20, wherein a cooling line 75 with a cooling fluid flowing therein passes through the first inlet opening 41, and wherein the cooling line 75 leaves the battery housing 20 again through the first outlet opening 50, after which it reenters the battery interior 30 via a return 85 through a further inlet opening 120 and, from the interior, passes back into the cooling circuit 80 through a further outlet opening 130. In each case, the direction of flow of the cooling fluid is indicated by arrows 81.

In contrast to the embodiment illustrated in FIG. 1, the condensing device 70 is designed as a cooling unit of the kind illustrated outside the battery housing 20 by reference sign 90 in FIG. 1. However, the condensing or cooling unit 70 in the illustrated example in FIG. 2 has a corresponding operation or action, i.e. it not only cools the battery interior 30 but also makes moisture present in the interior 30 condense on it and flow to the outside via the second outlet opening 60 in the direction of arrow 65 in the form of condensed water.

In this example too, the arrangement of the condensing or cooling unit 70 in the battery interior 30 is similar to the example shown in FIG. 1, wherein relative wind (represented by an arrow denoted 100) assists a cooling or condensing action. Of course, it is also possible for adsorbents to be arranged to assist the process in the example shown in FIG. 2.

The example shown in FIG. 2 can furthermore also comprise a porous material, e.g. a metal sponge, arranged on the condensing or cooling unit 70.

Finally, it may be mentioned that the dimensions shown in FIGS. 1 and 2 are not true to scale.

What is claimed is:

1. A condensing system for a battery in a vehicle, the condensing system comprising:
   a battery housing, which surrounds a battery interior, in which at least one battery cell is arranged;
   at least one first inlet opening, arranged in the battery housing, for a cooling fluid entering the battery interior;
   at least one first outlet opening and one second outlet opening, which are both arranged on the battery housing, wherein the first outlet opening is in fluid communication with the cooling fluid emerging from the battery interior; and
   a condensing device arranged in the battery interior comprises a porous material, and a cooling line arranged in the battery interior is in physical contact with and passes through the porous material, wherein operation of the condensing system causes moisture present in the battery interior and stemming from the environment to condense, and wherein the condensed moisture emerges into the environment through the second outlet opening.

2. The condensing system according to claim 1, wherein the porous material comprises a sponge produced from metal.

3. A condensing system for a battery in a vehicle, the condensing system comprising:
   a battery housing, which surrounds a battery interior, in which at least one battery cell is arranged;
   at least one first inlet opening, arranged in the battery housing, for a cooling fluid entering the battery interior;
   at least one first outlet opening and one second outlet opening, which are both arranged on the battery housing, wherein the first outlet opening is in fluid communication with the cooling fluid emerging from the battery interior;
a fluid line extending at least from the first inlet opening to the first outlet opening; and
a condensing device having the fluid line extending through the condensing device, the condensing device arranged in the battery interior and in fluid communication with the cooling fluid in the fluid line and which causes moisture present in the battery interior and stemming from the environment to condense, and wherein the condensed moisture emerges into the environment through the second outlet opening.

4. The condensing system according to claim 3, including a cooling unit, which is situated in a cooling circuit of the vehicle and is in fluid communication with the condensing device.

5. The condensing system according to claim 4, wherein the cooling unit is situated outside the battery housing.

6. A method for condensing moisture in a vehicle battery which comprises a battery housing and a battery interior having at least one battery cell arranged in the battery interior, wherein the method comprises the following steps:
providing at least one first inlet opening in the battery housing for a cooling fluid entering the battery interior;
providing at least one first outlet opening and one second outlet opening on the battery housing, wherein the first outlet opening is in fluid communication with the cooling fluid emerging from the battery interior; and
providing a condensing device, which is arranged in the battery interior and is in fluid communication with the cooling fluid and which causes moisture present in the battery interior and stemming from the environment to condense; and
providing a fluid line, which is arranged to extend through the condensing device, the cooling fluid being in fluid communication with the condensing device,
wherein the condensed moisture emerges into the environment through the second outlet opening.

* * * * *